(12) United States Patent
Cui (10) Patent No.: US 11,259,239 B2
(45) Date of Patent: Feb. 22, 2022

(54) METHOD, A DEVICE AND A MEDIUM FOR OBTAINING AND PROVIDING ACCESS INFORMATION OF A WIRELESS ACCESS POINT

(71) Applicant: SHANGHAI SHANGWANG NETWORK TECHNOLOGY CO., LTD., Shanghai (CN)

(72) Inventor: Yinglin Cui, Shanghai (CN)

(73) Assignee: SHANGHAI SHANGWANG NETWORK TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/867,580

(22) Filed: May 6, 2020

(65) Prior Publication Data

US 2020/0267635 A1 Aug. 20, 2020

Related U.S. Application Data

(63) Continuation of application No. PCT/CN2018/110374, filed on Oct. 16, 2018.

(30) Foreign Application Priority Data

Nov. 6, 2017 (CN) .......................... 201711080002.6
Mar. 5, 2018 (CN) .......................... 201810177636.1

(51) Int. Cl.
*H04W 48/16* (2009.01)
*H04W 76/11* (2018.01)
(Continued)

(52) U.S. Cl.
CPC ........... *H04W 48/16* (2013.01); *H04W 12/08* (2013.01); *H04W 48/20* (2013.01); *H04W 76/11* (2018.02)

(58) Field of Classification Search
CPC ........... H04W 4/12; H04W 4/14; H04W 4/18; H04W 84/02; H04W 84/12; H04W 84/14;
(Continued)

(56) References Cited

U.S. PATENT DOCUMENTS 10,374,996 B2 * 8/2019 Saoji ....................... H04L 51/22
2004/0203377 A1 * 10/2004 Eaton ...................... H04W 4/02
455/41.2
(Continued)

FOREIGN PATENT DOCUMENTS

| CN | 102638797 A | 8/2012 |
| CN | 103458409 A | 12/2013 |

(Continued)

*Primary Examiner* — Jean A Gelin
(74) *Attorney, Agent, or Firm* — Kilpatrick Townsend & Stockton, LLP (57) ABSTRACT

A method for obtaining and providing access information of a wireless access point, comprises: searching for wireless access points to obtain identification information of one or more wireless access points; generating a query request short message according to the identification information of the one or more wireless access points; sending the query request short message via a short message channel; receiving an access information short message including access information of the one or more wireless access points which is returned by a network device in response to the query request short message. When mobile data of a user equipment of the user is unavailable or when the user equipment does not support mobile data, the user equipment is able to send a query request via a short message and obtain information, such as a login password for accessing a wireless access point, from an access point information storage server.

10 Claims, 2 Drawing Sheets

(51) Int. Cl.
*H04W 12/08* (2021.01)
*H04W 48/20* (2009.01)

(58) Field of Classification Search
CPC ... H04W 88/06; H04W 88/08; H04W 88/184; H04W 48/16; H04W 48/20; H04W 12/02; H04W 12/06
See application file for complete search history.

(56) References Cited

U.S. PATENT DOCUMENTS

| | | | |
|---|---|---|---|
| 2007/0197237 A1 | 8/2007 | Powell et al. | |
| 2011/0282943 A1* | 11/2011 | Anderson | G06Q 10/107 709/204 |
| 2012/0184309 A1* | 7/2012 | Cohen | H04W 4/12 455/466 |
| 2012/0310839 A1* | 12/2012 | Chen | H04W 12/033 705/67 |
| 2014/0036687 A1* | 2/2014 | Papakostas | H04L 67/303 370/241 |
| 2016/0073351 A1* | 3/2016 | Cardozo | G06F 1/28 455/574 |
| 2016/0157159 A1* | 6/2016 | Goi | H04W 40/248 370/329 |
| 2016/0262082 A1* | 9/2016 | Flynn | H04W 52/028 |
| 2017/0289119 A1* | 10/2017 | Lauer | H04L 67/12 |
| 2018/0349376 A1* | 12/2018 | Boyer | G06F 3/167 |
| 2019/0228863 A1* | 7/2019 | Dharwad | G16H 40/67 |

FOREIGN PATENT DOCUMENTS

| | | |
|---|---|---|
| CN | 103476092 A | 12/2013 |
| CN | 104159255 A | 11/2014 |
| CN | 104427589 A | 3/2015 |
| CN | 104618991 A | 5/2015 |
| CN | 107889194 A | 4/2018 |
| CN | 108040356 A | 5/2018 |
| CN | 108430092 A | 8/2018 |
| WO | 2005094011 A2 | 10/2005 |

* cited by examiner

METHOD, A DEVICE AND A MEDIUM FOR OBTAINING AND PROVIDING ACCESS INFORMATION OF A WIRELESS ACCESS POINT

CROSS REFERENCE TO THE RELATED APPLICATION

This application is the continuation application of International Application No. PCT/CN2018/110374, filed on Oct. 16, 2018, which is based upon and claims priority to Chinese Patent Application No. 201711080002.6, filed on Nov. 6, 2017 and Chinese Patent Application No. 201810177636.1, filed on Mar. 5, 2018, the entire contents of which are incorporated herein by reference.

FIELD

The present specification relates to computer technologies, and particularly relates to a method, a device and a medium for obtaining and providing access information of a wireless access point.

BACKGROUND

With the popularity of mobile communications, more and more user terminal devices are connected to the network through wireless access points or mobile data. For example, people can surf the Internet through mobile data of mobile phones (for example, 3G (3rd-Generation, the third-generation mobile communication technology) or 4G (4th-Generation, the fourth generation mobile communication technology)), or they can connect to WiFi (WIreless-Fidelity) hotspots through mobile phones for Internet access. However, user's mobile data is limited, and a login password is required to connect to a WiFi, which means the user's Internet access requirements cannot be satisfied.

In the prior art, in order to facilitate solving the networking problem of the user equipment, it is possible to log in to the network after obtaining the password of a shared wireless access point (for example, a WiFi or a mobile hotspot). In the process of obtaining the login password, it is necessary to establish a connection with an access point information storage server through the mobile data of the user's mobile phone and request the login password for the wireless access point from the access point information storage server. However, in practical applications, some regions or countries may not support mobile data such as 3G or 4G, or some users may run out of their mobile data and cannot connect with telecom operators, which means the login password for the shared wireless access point cannot be obtained. Eventually the user equipment is not able to access the Internet through the shared wireless access point.

SUMMARY

The method, equipment, device and medium for obtaining and providing access information of a wireless access point provided in the embodiments of the present specification are used to solve the following shortcomings in the art: networking with a shared wireless access point with no mobile data.

A method for obtaining access information of a wireless access point at a user equipment is provided by an embodiment of the specification. The method comprises:

searching for wireless access points to obtain identification information of one or more wireless access points;

generating a query request short message according to the identification information of the one or more wireless access points;

sending the query request short message via an short message channel; and receiving an access information short message including access information of the one or more wireless access points which is returned by a network device in response to the query request short message.

In one embodiment, prior to generating the query request short message according to the identification information of the one or more wireless access points, the method further comprises:

determining a usage state of mobile data; and generating the query request short message according to the identification information of the one or more wireless access points when it is determined that the mobile data is unavailable.

In one embodiment, generating the query request short message according to the identification information of the one or more wireless access points comprises:

generating the query request short message according to encrypted or unencrypted identification information of the one or more wireless access points and an SP service code; or generating the query request short message to be sent to a specified SP service code according to encrypted or unencrypted identification information of the one or more wireless access points.

In one embodiment, sending the query request short message via the short message channel comprises:

sending the query request short message to an short message center of an operator, forwarding, by the short message center of the operator, the query request short message to an short message gateway, sending, by the short message gateway according to an SP service code carried in the query request short message, the query request short message to an access point information storage server for processing by the access point information storage server.

In one embodiment, processing by the access point information storage server comprises:

parsing the query request short message, by the access point information storage server, to extract the identification information of the one or more wireless access points;

retrieving and processing access information of the one or more wireless access points; and sending the processed identification information and access information of the one or more wireless access points to the user equipment.

In one embodiment, the access information short message comprises:

encrypted or unencrypted identification information of the one or more wireless access points; and encrypted or unencrypted access password of the one or more wireless access points.

In one embodiment, after receiving the access information short message including access information of the one or more wireless access points which is returned by the network device in response to the query request short message, the method further comprises:

parsing the access information short message and extracting identification information and access information of the one or more wireless access points; and connecting to one of the one or more wireless access points by using the identification information and the access information.

A device for obtaining access information of a wireless access point at a user equipment is provided by an embodiment of the specification. The device includes a memory for storing computer program instructions and a processor for executing program instructions, and the computer program instructions, when executed by the processor, trigger the device to perform the above-mentioned methods.

A method for providing access information of a wireless access point at a service device is provided by an embodiment of the specification. The method comprises:

receiving a query request short message, and the query request short message is generated according to identification information of one or more wireless access points; and returning an access information short message including access information of the one or more wireless access points to a user equipment in response to the query request short message.

In one embodiment, returning the access information short message including access information of the one or more wireless access points to the user equipment in response to the query request short message comprises:

parsing the query request short message to extract identification information of the one or more wireless access points;

retrieving and processing access information of the one or more wireless access points; and sending the processed identification information and access information of the one or more wireless access points to the user equipment.

In one embodiment, sending the processed identification information and access information of the one or more wireless access points to the user equipment comprises:

generating the access information short message according to the processed identification information and access information of the one or more wireless access points;

sending the access information short message to an short message gateway of an operator, sending, by the short message gateway of the operator, the access information short message to an short message center; and sending, by the short message center, the access information short message to the user equipment.

In one embodiment, the access information short message comprises:

encrypted or unencrypted identification information of the one or more wireless access points; and encrypted or unencrypted access password of the one or more wireless access points.

A device for providing access information of a wireless access point at a service device is provided by an embodiment of the specification. The device includes a memory for storing computer program instructions and a processor for executing program instructions, and the computer program instructions, when executed by the processor, trigger the device to perform the above-mentioned methods.

A computer readable medium storing computer readable instructions is provided by an embodiment of the specification, and the computer readable instructions executable by a processor to implement the above-mentioned methods.

The above-mentioned at least one technical solution adopted by the embodiments of the present specification can achieve the following beneficial effects: when mobile data of the user is unavailable, the user equipment is able to send a query request via an short message and obtain information, such as a login password for accessing a wireless access point, from an access point information storage server. Further, information such as the login password may be encrypted to be sent to the user equipment in an short message. User's need for connecting to a shared wireless access point can be satisfied when mobile data of the user equipment of the user is unavailable or when the user equipment does not support mobile data, which effectively improves a networking experience effect of the user.

DESCRIPTIONS OF THE DRAWINGS

In order to more clearly explain the technical solutions in the embodiments of the present specification or in the prior art, the following will briefly introduce the drawings required in the description of the embodiments or the prior art. Obviously, the drawings in the following description are merely some embodiments recorded in the present specification.

DETAILED EMBODIMENTS

Figure 1:
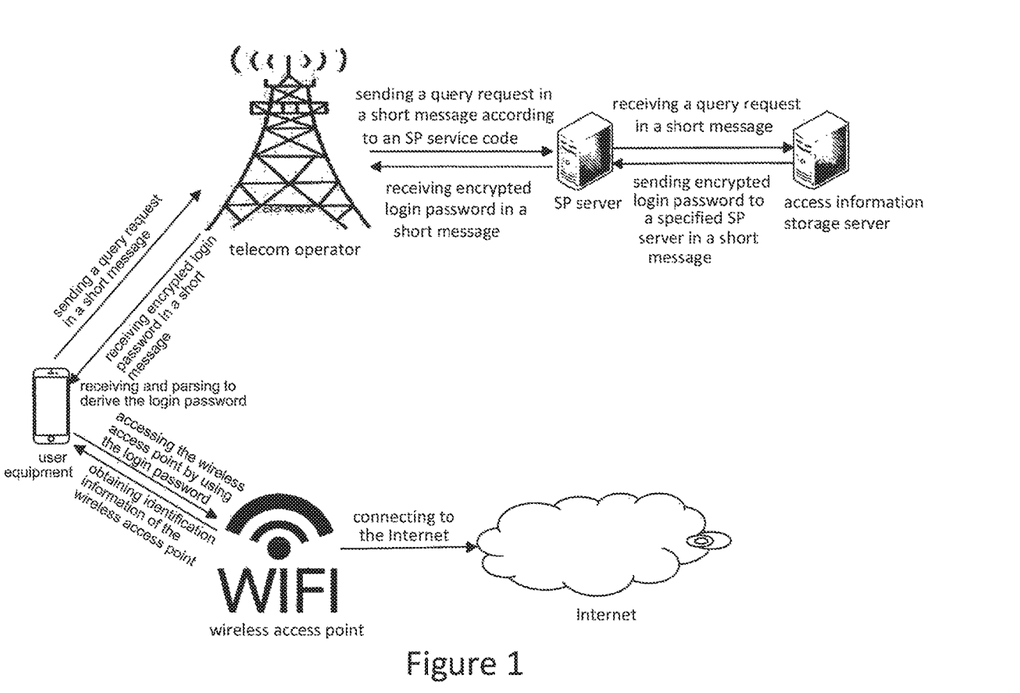
FIG. 1 is a schematic diagram of obtaining access information of a wireless access point at a user equipment involved in a practical application scenario of the solution of the specification.

FIG. 1 is a schematic diagram of obtaining access information of a wireless access point involved in a practical application scenario of the solution of the specification. When mobile data of a user's mobile phone is unavailable or when the user's mobile phone does not support mobile data, a query request carrying relevant information such as name, physical address, and service provider (SP) service code of a wireless access point can be sent to a telecom operator in a short message. The telecom operator obtains the SP service code from the short message. Further, the telecom operator sends the query request to a corresponding SP server according to the SP service code. The SP server then sends the SMS to a corresponding access point information storage server. Access information (e.g., a login password) corresponding to a wireless access point may be obtained based on information of various wireless access points such as name, physical address (MAC (Media Access Control or Medium Access Control)), and login password, etc. of the wireless access point, stored in advance in the access point information storage server. Further, encrypted access information such as the login password may be sent to the user's mobile phone in an SMS. The user's mobile phone is able to connect to a corresponding wireless access point.

It should be noted that the user equipment may be a device that have the function of networking with a telecom operator, such as a mobile phone, a smart watch, etc. If the user equipment is a mobile phone, a mobile phone card (a SIM (Subscriber Identity Module, customer identification module) card) installed in the mobile phone is required to support mobile data. The wireless access point can be an access point that can be used for networking, such as a WiFi hotspot, a mobile hotspot, etc. For ease of understanding, a mobile phone connecting to a WiFi hotspot is used as an example for description below.

Based on the schematic diagram of the above practical application scenario, the solution of the specification will be described in detail below.

Figure 2:
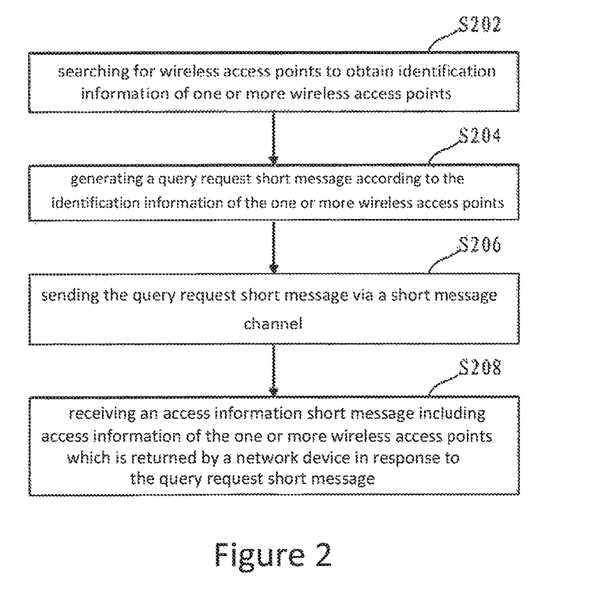
FIG. 2 is a schematic flowchart of a method for obtaining access information of a wireless access point at a user equipment provided by an embodiment of the specification.

A method for obtaining access information of a wireless access point at a user equipment is provided by an embodiment of the specification. A schematic flowchart of the method is illustrated in FIG. 2, and the method may comprise the following steps:

step S202, searching for wireless access points to obtain identification information of one or more wireless access points.

Assuming that the user equipment is a mobile phone, when the user turns on the wireless network switch of the mobile phone, signals of one or more wireless access points in the vicinity can be searched, and the user can select one or more wireless access points with strong signals. Further, relevant identification information of the wireless access point may be obtained.

It should be noted that the wireless access point described in the embodiments of the specification may be a WiFi hotspot or a mobile hotspot.

The method comprises: step S204, generating a query request short message according to the identification information of the one or more wireless access points.

Identification information of a wireless access point may include information, such as SSID (Service Set Identifier, e.g., name of a wireless access point) and/or BSSID (Basic Service Set Identifier, a special application of Ad-hoc LAN, e.g., MAC address of a wireless access point), which is used to identify different wireless access points. In addition, the identification information may also include address information, signal strength, etc. of the wireless access point to better provide available wireless access points for users.

The method comprises: step S206, sending the query request short message via a short message channel.

When mobile data is unavailable or when the user's mobile phone does not support mobile data, the query request is sent via the short message channel. It is understood that short message may be sent based on a GSM (Global System for Mobile Communication) system. The GSM system has advantages such as good global versatility, wide signal coverage, etc. Therefore, even when mobile data is unavailable or when the user's mobile phone does not support mobile data, data may be transmitted by way of short message. The query request may usually be in the form of short message.

The method comprises: step S208, receiving an access information short message including access information of the one or more wireless access points which is returned by a network device in response to the query request short message.

The network device may include a storage server for storing access information of wireless access points. The network device may also include devices used by operators to send short message, e.g., a short message center, a short message gateway, a base station, etc. Generally, the network device responds to the query request in the following manner: after receiving the query request at the storage server, obtaining access information from the access information stored in the storage server in advance according to the query request and generating an access information short message, sending the access information short message to a short message center, a short message gateway, a base station, etc. of the operator by the storage server, and eventually the access information short message being received by the user equipment.

The user equipment (e.g., a mobile phone, a smart watch) may establish a connection with a wireless access point by using the access information (e.g., a login password) after obtaining the access information.

The above method may be implemented by an application running in the user equipment. In an example, the application may be an APP (application) implementing sharing of wireless hotspots which is installed on the mobile phone.

It can be seen from the above method, dedicated mobile data may be provided according to an agreement with the telecom operation through the access point information storage server. The user equipment may use the dedicated mobile data to send the query request and obtain information, such as a login password for accessing the wireless access point, from the access point information storage server when the mobile data of the user equipment is unavailable. User's need for connecting to a shared wireless access point may be satisfied with no mobile data, which effectively improves the networking experience effect of the user.

In one or more embodiments of the specification, prior to generating the query request short message according to the identification information of the wireless access point, the method further comprises: determining a usage state of mobile data; and when it is determined that the mobile data is unavailable, generating the query request short message according to the identification information of the one or more wireless access points.

In an example, assuming that the user wants to establish a connection with a shared WiFi by his/her mobile phone, prior to sending the query request, it is determined whether the user's mobile phone can use mobile data. The determining method may be communicating with the telecom operator to check whether the mobile phone card (SIM card) supports mobile data, and further determining whether the mobile data connection of the mobile phone has been established (i.e., whether the switch of the wireless network connection of the mobile phone is turned on). When it is determined that the mobile data of the mobile phone is unavailable, a query request is generated according to the name and physical address of a searched wireless access point. It should be understood that the term "the mobile data is unavailable" used herein may indicate that the switch of the mobile data of the user equipment (e.g., the mobile phone) is turned off or the switch of the mobile data of the user equipment is turned on but the mobile phone cannot connect to the Internet by using the mobile data provided by the operator.

In one or more embodiments of the specification, generating the query request short message according to the identification information of the one or more wireless access points may comprise: generating the query request short message according to encrypted or unencrypted identification information of the one or more wireless access points and an SP service code; or generating the query request short message to be sent to a specified SP service code according to encrypted or unencrypted identification information of the one or more wireless access points.

Generally, short message transmissions between the user equipment and the access point information storage server are implemented via an SP server. In an example, the user equipment edits and generates a short message according to a pre-allocated or specified SP service code after obtaining the identification information of the wireless access point, and the SP service code may be a part of the short message or may be a code for the receiving end. To ensure confidentiality of the short message transmission of the query request, short message may be encrypted to effectively improve security effect.

Sending the query request short message via the short message channel may comprise: sending the query request short message to a short message center of an operator, forwarding, by the short message center of the operator, the query request short message to a short message gateway, sending, by the short message gateway according to an SP service code carried in the query request short message, the query request short message to the access point information storage server for processing by the access point information storage server.

A sender identifier (e.g., mobile phone number, etc.) is usually carried in the query request short message.

In practical applications, the SP server is an intermediate device connecting the telecom operator and the access point information storage server. The SP server is primarily used to forward the short message sent by the telecom operator to a corresponding access point information storage server, or to forward the short message generated by the access point information storage server to the operator. By way of the SP server, pressure on the access point information storage server regarding receiving and processing short message can be effectively alleviated, which can effectively improve the working efficiency of the access point information storage server.

In practical applications, the SP server may be provided by the telecom operator, or may be an SP server specified by a business party, or may be an SP server provided by a third part. The SP server is usually arranged in the vicinity of a base station of the telecom operation or in a computer room of the telecom operation.

In an example, assuming that a software for sharing wireless access points is installed on the mobile phone, the software may automatically generate and send short message according to the information in the query request. Specifically, the software extracts information of the searched wireless access point, generates text contents of short message, and composes the receiving number of the short message according to a receiving identification of the access point information storage server and the SP server which is stored in advance in the software. Automatic generation and transmission of the query request short message may be implemented by using the software. Of course, it is possible for the user to edit the information in the query request as a short message and send it to a specified server manually.

In one or more embodiments of the specification, processing by the access point information storage server may comprise: parsing the query request short message, by the access point information storage server, to extract the identification information of the one or more wireless access points; retrieving and processing access information of the one or more wireless access points; sending the processed identification information and access information of the one or more wireless access points to the user equipment.

After receiving the encrypted access information through the short message channel, the access point information storage server first parses the encrypted query request short message according to a preset parsing algorithm to obtain the identification information therein. Further, the access point information storage server retrieves the access information (e.g., login passwords, etc.) of the corresponding one or more access points according to the identification information.

In one or more embodiments of the specification, the access information short message may comprise: encrypted or unencrypted identification information of the one or more wireless access points; and encrypted or unencrypted access password of the one or more wireless access points.

To ensure that the access information can be transmitted securely, the access information and/or identification information needs to be encrypted. Further, the encrypted access information and identification information are used to generate an access information short message, which is sent to a corresponding user equipment according to the sender identifier.

In one or more embodiments of the specification, after receiving the access information short message including access information of the one or more wireless access points which is returned by the network device in response to the query request short message, the method further comprises: parsing the access information short message and extracting identification information and access information of the one or more wireless access points; connecting to one of the one or more wireless access points by using the identification information and the access information.

In practical applications, the identification information of the wireless access point corresponds to the access information of the wireless access point one by one. When attempting to connect to the wireless access point, the corresponding access information is input to the corresponding identification information to log in. In order to ensure effective login, multiple pieces of identification information and corresponding access information sometimes can be obtained at the same time. When one wireless access point cannot be connected, the target of connecting will automatically change to a next access point, and eventually a wireless access point that can be connected is selected. When all of the multiple access points obtained this time cannot be connected, the user is prompted of failing to connect, and other wireless access points are recommended for the user.

Figure 3:
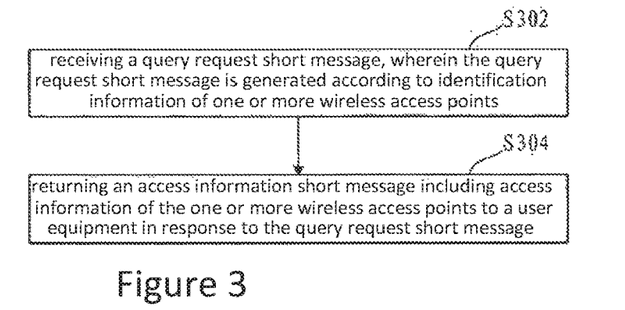
FIG. 3 is a schematic flowchart of a method for providing access information of a wireless access point at a service device provided by an embodiment of the specification.

A method for providing access information of a wireless access point at a service device is also provided by an embodiment of the specification based on a similar principle. A schematic flowchart of the method is illustrated in FIG. 3, and the method may comprise the following steps:

step S302, receiving a query request short message, and the query request short message is generated according to identification information of one or more wireless access points.

When mobile data is unavailable, the service device (i.e., an access point information storage server) receives the short message via the short message channel. The query request short message may contain identification information of one or more wireless access points. Since some wireless access points are not available, identification information of one or more wireless access points is usually carried in one short message to improve success rate of connection.

The method comprises: step S304, returning an access information short message including access information of the one or more wireless access points to a user equipment in response to the query request short message.

Access information of the wireless access points is determined according to the query request.

The query request carries SSID and/or BSSID. The SSID and/or BSSID and access information are stored in the access point information storage server in a preset correspondence manner. In an example, name, MAC address and corresponding access information of a wireless access point may be stored in advance in a manner based on a pointer, a key value or a datasheet, so that corresponding access information may be easily obtained according to the query request short message.

Of course, in order to more accurately locate the required access information, access information may be determined according to the actual location of the wireless access point which is carried in the query request. When the wireless access point cannot be accessed, the access point information storage server may also recommend a shared wireless access point in the vicinity which is available based on the actual location, which can effectively improve the user experience.

In one or more embodiments of the specification, returning the access information short message including access information of the one or more wireless access points to the user equipment in response to the query request short message may comprise: parsing the query request short message to extract identification information of the one or more wireless access points; retrieving and processing access information of the one or more wireless access points; sending the processed identification information and access information of the one or more wireless access points to the user equipment.

After receiving the encrypted access information short message via the short message channel, the access point information storage server first parses the encrypted query request short message according to a preset parsing algorithm to obtain the identification information therein. Further, the access point information storage server retrieves access information (e.g., login passwords, etc.) of the corresponding one or more access points according to the identification information.

In one or more embodiments of the specification, sending the processed identification information and access information of the one or more wireless access points to the user equipment may comprise: generating the access information short message according to the processed identification information and access information of the one or more wireless access points; sending the access information short message to a short message gateway of an operator, sending, by the short message gateway of the operator, the access information short message to a short message center; sending, by the short message center, the access information short message to the user equipment.

The access point information storage server sends the identification information and corresponding access information to the gateway of the operator and the short message center by way of short message after obtaining the identification information and corresponding access information. The short message center sends the identification information and corresponding access information to a corresponding user equipment according to the sender identifier.

In one or more embodiments of the specification, the access information short message may comprise: encrypted or unencrypted identification information of the one or more wireless access points; and encrypted or unencrypted access password of the one or more wireless access points.

To ensure that the access information can be transmitted securely, the access information and/or identification information needs to be encrypted. Further, the encrypted access information and identification information are used to generate the access information short message, which is sent to a corresponding user equipment according to the sender identifier.

A device for obtaining access information of a wireless access point at a user equipment is also provided by an embodiment of the specification based on a similar principle. The device includes a memory for storing computer program instructions and a processor for executing program instructions, and the computer program instructions, when executed by the processor, trigger the device to perform the above-mentioned methods.

A device for providing access information of a wireless access point at a service device is also provided by an embodiment of the specification based on a similar principle. The device includes a memory for storing computer program instructions and a processor for executing program instructions, and the computer program instructions, when executed by the processor, trigger the device to perform the above-mentioned methods.

A computer readable medium storing computer readable instructions is also provided by an embodiment of the specification based on a similar principle, and the computer readable instructions executable by a processor to implement the above-mentioned methods.

Figure 4:
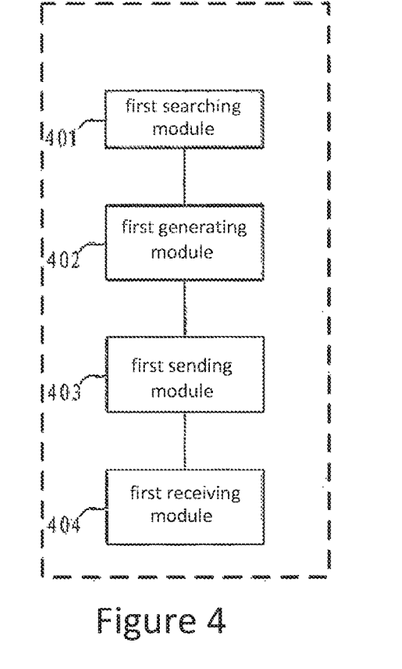
FIG. 4 is a schematic diagram of a device for obtaining access information of a wireless access point at a user equipment provided by an embodiment of the specification.

A device for obtaining access information of a wireless access point at a user equipment is also provided by an embodiment of the specification based on a similar principle. The device is as illustrated in FIG. 4, and may comprise:

a first searching module 401, for searching for wireless access points to obtain identification information of one or more wireless access points;

a first generating module 402 for generating a query request short message according to the identification information of the one or more wireless access points;

a first sending module 403 for sending the query request short message via an short message channel; and a first receiving module 404 for receiving an access information short message including access information of the one or more wireless access points which is returned by a network device in response to the query request short message.

Further, the first generating module 402 is also used to determine a usage state of mobile data, and generate the query request short message according to the identification information of the one or more wireless access points when it is determined that mobile data is unavailable.

Further, the first generating module 402 is used to generate the query request short message according to encrypted or unencrypted identification information of the one or more wireless access points and an SP service code, or generate the query request short message to be sent to a specified SP service code according to encrypted or unencrypted identification information of the one or more wireless access points.

Further, the first sending module 403 is used to send the query request short message to an short message center of an operator, forward, by the short message center of the operator, the query request short message to a short message gateway, send, by the short message gateway according to an SP service code carried in the query request short message, the query request short message to the access point information storage server for processing by the access point information storage server.

Further, processing by the access point information storage server comprises:

parsing the query request short message, by the access point information storage server, to extract the identification information of the one or more wireless access points;

retrieving and processing access information of the one or more wireless access points; and sending the processed identification information and access information of the one or more wireless access points to the user equipment.

Further, the access information short message comprises:

encrypted or unencrypted identification information of the one or more wireless access points; and encrypted or unencrypted access password of the one or more wireless access points.

Further, after receiving the access information short message including access information of the one or more wireless access points which is returned by the network device in response to the query request short message, the following steps are further included:

parsing the access information short message and extracting identification information and access information of the one or more wireless access points; and connecting to one of the one or more wireless access points by using the identification information and the access information.

Figure 5:
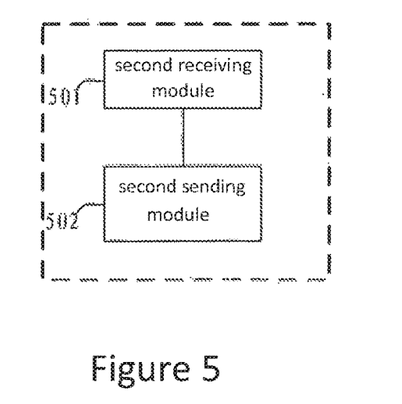
FIG. 5 is a schematic diagram of a device for providing access information of a wireless access point at a service device provided by an embodiment of the specification.

A device for providing access information of a wireless access point at a service device is also provided by an embodiment of the specification based on a similar principle. The device is as illustrated in FIG. 5, and may comprise:

a second receiving module 501 for receiving a query request short message, and the query request short message is generated according to identification information of one or more wireless access points; and a second sending module 502 for returning an access information short message including access information of the one or more wireless access points to a user equipment in response to the query request short message.

Further, returning the access information short message including access information of the one or more wireless access points to the user equipment in response to the query request short message comprises:

parsing the query request short message to extract identification information of the one or more wireless access points;

retrieving and processing access information of the one or more wireless access points; and sending the processed identification information and access information of the one or more wireless access points to the user equipment.

Further, sending the processed identification information and access information of the one or more wireless access points to the user equipment comprises:

generating the access information short message according to the processed identification information and access information of the one or more wireless access points;

sending the access information short message to a short message gateway of an operator, sending, by the short message gateway of the operator, the access information short message to a short message center; and sending, by the short message center, the access information short message to the user equipment.

Further, the access information short message comprises:

encrypted or unencrypted identification information of the one or more wireless access points; and encrypted or unencrypted access password of the one or more wireless access points.

It can be seen from the above device, when mobile data of a user is unavailable, the user equipment is able to send a query request via a short message and obtain information, such as a login password for accessing a wireless access point, from an access point information storage server. Further, information such as the login password may be encrypted to be sent to the user equipment in a short message. User's need for connecting to a shared wireless access point can be satisfied when mobile data of the user is unavailable or when the user equipment does not support mobile data, which effectively improves a networking experience effect of the user.

The embodiments in the specification are described in a progressive manner. The identical or similar parts among the embodiments can be referred to each other, and an aspect detailed and emphasized by each embodiment is the part which is different from that in other embodiments. In particular, for the device and media embodiments, since they are basically similar to the method embodiments, the description is relatively simple, and the relevant parts can be referred to a part of the description of the method embodiments.

The devices and the media provided in the embodiments of the present application correspond to the method in a one-to-one manner. Therefore, the devices and the media also have beneficial technical effects similar to their corresponding methods. The beneficial technical effects of devices and media are not repeated here since the beneficial technical effects of the methods have been described in detail above.

Embodiments of the present disclosure may be provided as methods, systems, or computer program products. Therefore, the present disclosure may take the form of an embodiment entirely implemented in hardware, an embodiment entirely implemented in software, or an embodiment implemented by combining software and hardware. Moreover, the present disclosure may take the form of a computer program product implemented on one or more computer usable storage media (including but not limited to disk storage, CD-ROM, optical storage, etc.) containing computer usable program code.

The present disclosure is described with reference to flowcharts and/or block diagrams of methods, devices (systems), and computer program products according to the embodiments of the present disclosure. It should be understood that each flow and/or block in the flowchart and/or block diagram and a combination of the flow and/or block in the flowchart and/or block diagram may be implemented by computer program instructions. These computer program instructions can be provided to a processor of a general-purpose computer, a special-purpose computer, an embedded processing machine, or other programmable data processing devices to produce a machine that enables the instructions executed by the processor of the computer or other programmable data processing devices to produce an apparatus for implementing the functions specified in one flow or multiple flows of a flowchart and/or one block or multiple blocks of a block diagram.

These computer program instructions may also be stored in a computer readable memory that can direct a computer or other programmable data processing devices to work in a specific manner, so that the instructions stored in the computer readable memory produce an article of manufacture including an instruction device, and the instruction device implements the functions specified in one block or multiple blocks of a flowchart and/or one block or multiple blocks of a block diagram.

These computer program instructions can also be loaded onto a computer or other programmable data processing devices, so that a series of operating steps are performed on the computer or other programmable devices to produce computer-implemented processing, so that the instructions executed on the computer or other programmable devices provide steps for implementing the functions specified in one flow or multiple flows of a flowchart and/or one block or multiple blocks in a block diagram.

In a typical configuration, a computing device includes one or more processors (CPUs), input/output interfaces, network interfaces, and memories.

The memory may include a non-permanent memory, a random access memory (RAM) and/or a non-volatile memory and the like in a computer-readable medium, such as a read-only memory (ROM) or a flash memory (flash RAM)). A memory is an example of a computer-readable medium.

A computer-readable medium comprises permanent and non-permanent, movable and non-movable media and may implement information storage by means of any method or technology. Information may be computer-readable instructions, data structures, program modules or other data. The examples of a computer storage medium include but are not limited to a phase change memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, compact disk read-only memory (CD-ROM), a digital versatile disc (DVD) or other optical storages, a magnetic cassette tape, and magnetic tape and magnetic disk storage or other magnetic storage devices or any other non-transmission media, which can be used to store information that can be accessed by a computing device. According to the definition herein, the computer-readable medium does not include a non-transitory computer-readable medium, such as a modulated data signal and a carrier.

It should also be noted that the terms "comprise", "include", "contain" or any other variant thereof are intended to cover non-exclusive inclusion, so that a process, method, goods or device that includes a series of elements not only includes those elements, but also includes other elements not explicitly listed, or include elements inherent to such process, method, goods, or device. With no further restrictions, the element defined by the sentence "include an . . . " does not exclude that there are other identical elements in the process, method, goods, or device that includes the element.

What is claimed is:

1. A method for obtaining access information of a wireless access point at a user equipment, comprising:
    searching for wireless access points to obtain identification information of one or more wireless access points;
    determining a usage state of mobile data;
    generating a query request short message according to the identification information of the one or more wireless access points when the mobile data is unavailable, wherein generating the query request short message comprises generating the query request short message according to encrypted or unencrypted identification information of the one or more wireless access points and an SP service code or generating the query request short message to be sent to a specified SP service code according to encrypted or unencrypted identification information of the one or more wireless access points;
    sending the query request short message via a short message channel; and
    receiving an access information short message including access information of the one or more wireless access points which is returned by a network device in response to the query request short message.

2. The method as recited in claim 1, wherein the step of sending the query request short message via the short message channel, specifically comprising:
    sending the query request short message to a short message center of an operator, forwarding, by the short message center of the operator, the query request short message to a short message gateway, sending, by the short message gateway according to the SP service code carried in the query request short message, the query request short message to an access point information storage server for processing by the access point information storage server.

3. The method as recited in claim 2, wherein the step of processing by the access point information storage server, comprising:
    parsing, by the access point information storage server, the query request short message to extract the identification information of the one or more wireless access points;
    retrieving and processing access information of the one or more wireless access points; and
    sending the processed identification information and access information of the one or more wireless access points to the user equipment.

4. The method as recited in claim 1, wherein the access information short message comprising:
    encrypted or unencrypted identification information of the one or more wireless access points; and
    encrypted or unencrypted access passwords of the one or more wireless access points.

5. The method as recited in claim 4, wherein after the step of receiving the access information short message including access information of the one or more wireless access points which is returned by the network device in response to the query request short message, the method further comprising:
    parsing the access information short message and extracting identification information and access information of the one or more wireless access points; and
    connecting to one of the one or more wireless access points by using the identification information and the access information.

6. A method for providing access information of a wireless access point at a service device, comprising:
    receiving a query request short message from a user equipment, wherein the query request short message is generated according to identification information of one or more wireless access points in response to a determination that mobile data of the user equipment is unavailable, wherein the query request short message is generated according to encrypted or unencrypted identification information of the one or more wireless access points and an SP service code or the query request short message is generated according to encrypted or unencrypted identification information of the one or more wireless access points and is to be sent to a specified SP service code; and
    returning an access information short message including access information of the one or more wireless access points to the user equipment in response to the query request short message.

7. The method as recited in claim 6, wherein the step of returning the access information short message including access information of the one or more wireless access points to the user equipment in response to the query request short message, comprising:

parsing the query request short message to extract identification information of the one or more wireless access points;
retrieving and processing access information of the one or more wireless access points; and
sending the processed identification information and access information of the one or more wireless access points to the user equipment.

8. The method as recited in claim 7, wherein the step of sending the processed identification information and access information of the one or more wireless access points to the user equipment comprising:
generating the access information short message according to the processed identification information and access information of the one or more wireless access points;
sending the access information short message to a short message gateway of an operator, sending, by the short message gateway of the operator, the access information short message to a short message center; and
sending, by the short message center, the access information short message to the user equipment.

9. The method as recited in claim 8, wherein the access information short message comprising:
encrypted or unencrypted identification information of the one or more wireless access points; and
encrypted or unencrypted access password of the one or more wireless access points.

10. A device for obtaining access information of a wireless access point at a user equipment, the device including a memory for storing computer program instructions and a processor for executing program instructions, wherein the computer program instructions, when executed by the processor, trigger the device to perform the method as recited in claim 1.

* * * * *